United States Patent
Ghosh et al.

(10) Patent No.: US 7,475,056 B2
(45) Date of Patent: *Jan. 6, 2009

(54) QUERY PROCESSING IN A PARALLEL SINGLE CURSOR MODEL ON MULTI-INSTANCE CONFIGURATIONS, USING HINTS

(75) Inventors: Bhaskar Ghosh, Burlingame, CA (US); Thierry Cruanes, Foster City, CA (US); Benoit Dageville, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 11/202,453

(22) Filed: Aug. 11, 2005

(65) Prior Publication Data

US 2007/0038595 A1 Feb. 15, 2007

(51) Int. Cl.
*G06F 17/30* (2006.01)
(52) U.S. Cl. .................. 707/2; 707/3; 707/4; 707/5; 707/6
(58) Field of Classification Search .................. 707/2–6
See application file for complete search history.

(56) References Cited

U.S. PATENT DOCUMENTS

| | | |
|---|---|---|
| 4,769,772 A | 9/1988 | Dwyer |
| 4,860,201 A | 8/1989 | Stolfo et al. |
| 5,325,525 A | 6/1994 | Shan et al. .................. 718/104 |
| 5,495,606 A | 2/1996 | Borden et al. |
| 5,765,146 A | 6/1998 | Wolf et al. ..................... 707/2 |
| 5,822,750 A | 10/1998 | Jou et al. |
| 5,835,755 A | 11/1998 | Stellwagen, Jr. |
| 5,857,180 A | 1/1999 | Hallmark et al. |
| 5,864,839 A | 1/1999 | Bourgoin |
| 5,937,401 A | 8/1999 | Hillegas |
| 6,081,801 A | 6/2000 | Cochrane et al. |
| 6,085,189 A | 7/2000 | Pirahesh et al. |
| 6,112,198 A | 8/2000 | Lohman et al. |
| 6,289,334 B1 | 9/2001 | Reiner et al. |
| 6,411,951 B1 | 6/2002 | Galindo-Legaria et al. |
| 6,430,550 B1 | 8/2002 | Leo et al. |

(Continued)

OTHER PUBLICATIONS

U.S. Appl. No. 10/901,411, filed Jul. 27, 2004, Office Action Mailing Date Mar. 22, 2007.

(Continued)

*Primary Examiner*—Apu M Mofiz
*Assistant Examiner*—Cindy Nguyen
(74) *Attorney, Agent, or Firm*—Hickman Palermo Truong & Becker LLP

(57) ABSTRACT

A database statement is processed in a multi-server system, in a manner to increase the possibility that slave server processes on remote nodes will generate execution plans that are equivalent to the corresponding execution plan generated by the query coordinator process. A set of hints is generated based on the same information on which the master plan is based. The set of hints is sent to remote nodes, where respective remote plans are generated based in part on the set of hints. Use of the hints in generation of the remote plan increases the possibility that the remote plan will be equivalent to the master plan and that the slaves on the other database server will be able to join in parallel processing of the database statement.

22 Claims, 4 Drawing Sheets

U.S. PATENT DOCUMENTS

| | | |
|---|---|---|
| 6,466,931 B1 | 10/2002 | Attaluri et al. |
| 6,507,834 B1 | 1/2003 | Kabra et al. |
| 6,529,901 B1 | 3/2003 | Chaudhuri et al. |
| 6,601,064 B1 | 7/2003 | Nag et al. |
| 6,622,138 B1 | 9/2003 | Bellamkonda et al. |
| 6,625,593 B1 | 9/2003 | Leung et al. |
| 6,721,724 B1 | 4/2004 | Galindo-Legaria et al. |
| 6,910,032 B2 | 6/2005 | Carlson et al. |
| 6,928,451 B2 | 8/2005 | Mogi et al. |
| 6,954,776 B1 | 10/2005 | Cruanes et al. |
| 6,968,335 B2 | 11/2005 | Bayliss et al. |
| 7,020,661 B1 | 3/2006 | Cruanes et al. |
| 7,051,034 B1 | 5/2006 | Ghosh et al. ............... 707/100 |
| 7,089,356 B1 | 8/2006 | Chen et al. |
| 7,234,112 B1 * | 6/2007 | Brown et al. ............... 715/713 |
| 2002/0038300 A1 | 3/2002 | Iwata et al. |
| 2003/0055813 A1 | 3/2003 | Chaudhuri et al. ............ 707/3 |
| 2003/0065644 A1 * | 4/2003 | Horman et al. ................ 707/1 |
| 2003/0187831 A1 | 10/2003 | Bestgen et al. |
| 2003/0208489 A1 | 11/2003 | Todd |
| 2003/0229640 A1 | 12/2003 | Carlson et al. |
| 2004/0172626 A1 | 9/2004 | Jalan et al. |
| 2004/0268227 A1 | 12/2004 | Brid |
| 2005/0004907 A1 | 1/2005 | Bruno et al. |
| 2005/0049996 A1 | 3/2005 | Srinivasan et al. |
| 2005/0125398 A1 | 6/2005 | Das et al. ........................ 707/4 |
| 2005/0131879 A1 | 6/2005 | Ghosh et al. ................... 707/3 |
| 2005/0131881 A1 | 6/2005 | Ghosh et al. ................... 707/3 |
| 2005/0131890 A1 | 6/2005 | Cruanes et al. |
| 2005/0132383 A1 | 6/2005 | Ghosh et al. ................ 719/312 |

OTHER PUBLICATIONS

U.S. Appl. No. 10/824,887, filed Apr. 13, 2004, Office Action Mailing Date Mar. 12, 2007.
U.S. Appl. No. 10/944,175, filed Sep. 16, 2004, Office Action Mailing Date Feb. 7, 2007.
U.S. Appl. No. 10/930,433, filed Aug. 30, 2004, Office Action Mailing Date Jan. 25, 2007.
U.S. Appl. No. 10/865,178, filed Jun. 9, 2004, Office Action Mailing Date Jul. 28, 2006.
"Query Optimization in Oracle Database 10g Release 2" An Oracle White Paper (Jun. 2005) (30 pages).
Oracle, "Query Optimization in Oracle Database 10g Release 2", An Oracle White Paper, Jun. 2005, 30 pages.
"Data Sheet Oracle Tuning Pack", Mar. 31, 2003, 7 pages.
"Using Plan Stability", retrieved on Dec. 23, 2005 from the Internet, URL: http://www.lc.leidenuniv.nl/awcourse/oracle/server.920/a96533/outlines.htm, 2000, 11 pages.
"Office Action" received in related case U.S. Appl. No. 10/944,175, filed Sep. 16, 2004, 20 pages.

* cited by examiner

QUERY PROCESSING IN A PARALLEL SINGLE CURSOR MODEL ON MULTI-INSTANCE CONFIGURATIONS, USING HINTS

CROSS-REFERENCE TO RELATED APPLICATIONS

This application is related to the following applications, the contents of all of which are incorporated by this reference in their entirety for all purposes as if fully disclosed herein:

U.S. patent application Ser. No. 10/901,411 filed on Jul. 27, 2004, entitled "Parallel Single Cursor Model on Multi-Server Configurations";

U.S. patent application Ser. No. 10/944,175 filed on Sep. 16, 2004, entitled "Executing a Parallel Single Cursor Model";

U.S. patent application Ser. No. 10/824,887 filed on Apr. 13, 2004, entitled "Compilation and Processing a Parallel Single Cursor Model"; and U.S. patent application Ser. No. 10/936,781 filed on Sep. 7, 2004, entitled "Global Hints".

FIELD OF THE INVENTION

The present invention relates to managing data and, more specifically, to parallelizing operations that involve managing data in multiple-server systems.

BACKGROUND

Database applications interact with a database server by submitting to the database server commands that cause the database server to perform operations on data stored in a database. A database command that is sent from a database application to a database server contains the "original statement" of the database command.

For the database server to process the commands, the commands must conform to a database language supported by the database server. One database language supported by many database servers is known as the Structured Query Language (SQL).

When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command.

Various database languages, such as SQL, support special-purpose constructs referred to herein as "cursors". During the compilation of a query statement, the database server may perform a significant amount of preliminary work for the statement, such as parsing, semantic analysis, and query plan generation. A cursor stores the results of much of this preliminary work. For example, one set of information stored in a cursor includes the execution plan for performing the operations specified by the SQL statement.

One method of representing an execution plan is a row-source tree. At execution, traversal of a row-source tree from the bottom up yields a sequence of steps for performing the operation(s) specified by the SQL statement. A row-source tree is composed of row-sources. During the compilation process, row-sources are allocated, and each row-source is linked to zero, one, two, or more underlying row-sources. The makeup of a row-source tree depends on the query and the decisions made by a query optimizer during the compilation process. Typically, a row-source tree is comprised of multiple levels. The lowest level, the leaf nodes, access rows from a database or other data store. The top row-source, the root of the tree, produces, by composition, the rows of the query that the tree implements. The intermediate levels perform various transformations on rows produced by underlying row-sources.

The row-source tree representation of execution plans is described in detail in U.S. Pat. No. 5,857,180, entitled "Method and apparatus for implementing parallel operations in a database management system", issued to Hallmark et al on Jan. 5, 1999, the entire contents of which are incorporated herein. Hallmark also describes a "row-source approach" for parallelizing the operations required by an SQL command by parallelizing portions of the execution plan of the query. The row-source approach to parallelizing queries is described in greater detail below.

Parallel Execution of a Query Using Slave SQL

Sequential query execution uses one processor and one storage device at a time. In contrast, parallel query execution uses multiple processes to execute, in parallel, suboperations of a query. For example, virtually every query execution includes some form of manipulation of rows in a relation, or table of the database management system (DBMS). Before any manipulation can be done, the rows must be read, or scanned. In a sequential scan, the table is scanned using one process. Parallel query systems provide the ability to break up the scan such that more than one process can get involved in performance of the table scan.

Various techniques have been developed for parallelizing queries. Such techniques typically rely on an underlying query processing model. For example, one model (a "row-source model") for parallelizing queries is described, in U.S. Pat. No. 5,857,180, which was mentioned above. According to the row-source (iterator) model of SQL execution, data flows through the SQL operations modeled by a row-source in the form of row-vectors. Specifically, a parallel plan is built on the Query Coordinator (QC). The parallel plan is subdivided into sub-plans or sub-trees, each called a DFO (Data Flow Object), each of which are scheduled and run in parallel on a set of parallel execution slaves.

One of the main design issues in any parallel SQL execution engine is how to express and communicate these tasks or sub-plans to the parallel slave processes. According to one implementation of the row-source model, a specialized form of SQL, called slave SQL, is used to express such tasks or sub-plans. Slave SQL is standard SQL plus some extensions to support notions like data partitioning and flow of partitioned data from one DFO to another.

According to the same approach, the slave SQL, corresponding to each DFO, is sent to slaves. Upon receiving a slave SQL command, a slave compiles the slave SQL and executes the slave SQL using control information sent from the QC. The global parallel plan has a SQL cursor corresponding to each Data Flow Object (DFO). So, running a parallel query involves parsing, unparsing and executing a parallel cursor on the QC side and parsing and executing on a slave set one cursor per DFO.

When compiled by slaves, the DFO cursors expressed in slave SQL often generate special row-sources that a QC plan would never show. Given the complexity of this picture, parallel queries can be hard to manage, monitor and tune. Also, generating slave SQL for each DFO from the physical execution plan (comprising of row-source plus some parallel annotation) is difficult and error-prone, since the compilation structures get manipulated and transformed extensively after the high level SQL gets parsed, semantic-checked, optimized and compiled into the physical row-source plan.

As explained above, slave SQL is a means to generate the correct execution plan on the slave. To do this the database server has to add, parse and maintain special slave SQL constructs such as group-by staging operators, bitmap index specific operators, etc. Supporting slave SQL requires specialized slave-specific support from parsing all the way through execution. The amount of slave-specific support required to support the slave SQL approach results in a preponderance of slave specific code and has historically caused a large number of bugs. In addition, the new constructs required by slave SQL have to be SQL expressible.

As mentioned above, one step in the generation of the slave SQL statements that are sent to the slave sets is the unparsing of the row-source tree created for the original statement, and the data-flow operators contained therein. Such unparsing operations are difficult and error-prone. Typically, the database server has to generate a (supposedly implementation free) high level representation of the operations represented by each of the data flow operators. Within a relational database system that supports the SQL language, it is natural that the SQL language is used to express such high level representations of dataflow operators.

Thus, while the original statement is parsed to derive the query plan, portions of the query plan must be "un-parsed" to produce slave SQL statements. Unfortunately, by the time the database server reaches the post-compilation phase, when unparsing for slave SQL is performed, the compilation process has modified or moved around information (e.g. predicates) that needs to be gathered together again to correctly regenerate a query. This unparsing process is very specific to the parallel execution engine and requires statement-specific support, which can be cumbersome and error-prone.

In addition, using the slave SQL approach, parallelization of new SQL operations is usually done well after the design and implementation of the serial operation. Some of the decisions taken in the compilation layers for the serial implementation (which is based on the original statement) can contradict the requirements of generation and support for slave SQL.

Parallel Execution of a Query Using Parallel Shared Cursor Model

One approach to executing queries (or portions thereof) in parallel in a multiple-server environment, without using slave SQL to communicate to each slave the operations to be performed by the slave, is described in U.S. patent application Ser. No. 10/901,411.

The approach described therein is referred to as the "parallel shared cursor" (PSC) model of processing, in parallel, the operations specified in SQL queries. With the PSC model, instead of generating one cursor for the query coordinator (QC) based on the original statement, and separate cursors for each DFO based on the slave SQL, either (1) the cursor that is generated from the original statement, or (2) an equivalent cursor, is shared among the various participants involved in the parallel execution of the operations specified in the original statement.

The PSC model provides a simpler and more manageable architecture for parallel SQL cursors. Specifically, in the PSC model, the database server builds a single cursor that contains the information needed for parallel execution and is used for the entire parallel execution process, by both the QC and the slaves on a single instance of the database server where cursor sharing is possible. Because QC unparsing and slave parse support for slave SQL is no longer required, the support of new features, monitoring of query progression, and diagnosability of query performance, become better. However, slaves on remote nodes may still generate a query execution plan that is not equivalent to the plan generated by the QC and, therefore, are unable to join in parallel processing of the query.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Techniques are described for parallelizing operations that involve managing data in multiple-server systems. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

Techniques are described herein for processing a database statement in a multi-server system, such as a database system configured in a cluster or a grid. Generally, these techniques increase the possibility that slave server processes, e.g., on remote nodes, will generate an execution plan for the database statement that is equivalent to the corresponding execution plan generated by the query coordinator process. If an equivalent execution plan is generated on a remote node, then slave processes on that node are able to join in the parallel processing of the database statement.

One database server receives the database statement and generates a master plan about how to execute the statement. In addition, a set of hints is generated based on the master plan. The hints represent directives that influence an execution plan generated for the database statement. There are many types of hints that may be generated for influencing an execution plan.

For example, hints may involve particular access paths, join orders, join types, and the like.

With parallel processing of a database statement, i.e., processing by multiple servers and/or processors, it is generally desirable to get as many slave processes to join in the processing of the statement as possible. Hence, within another database server, a remote plan is generated about how to execute the database statement, based on the set of hints. Use of the hints in generation of the remote plan increases the possibility that the remote plan will be equivalent to the master plan and that the slaves on the other database server will be able to join in the processing of the statement.

Operating Environment: Multi-Server Configuration

Figure 1:
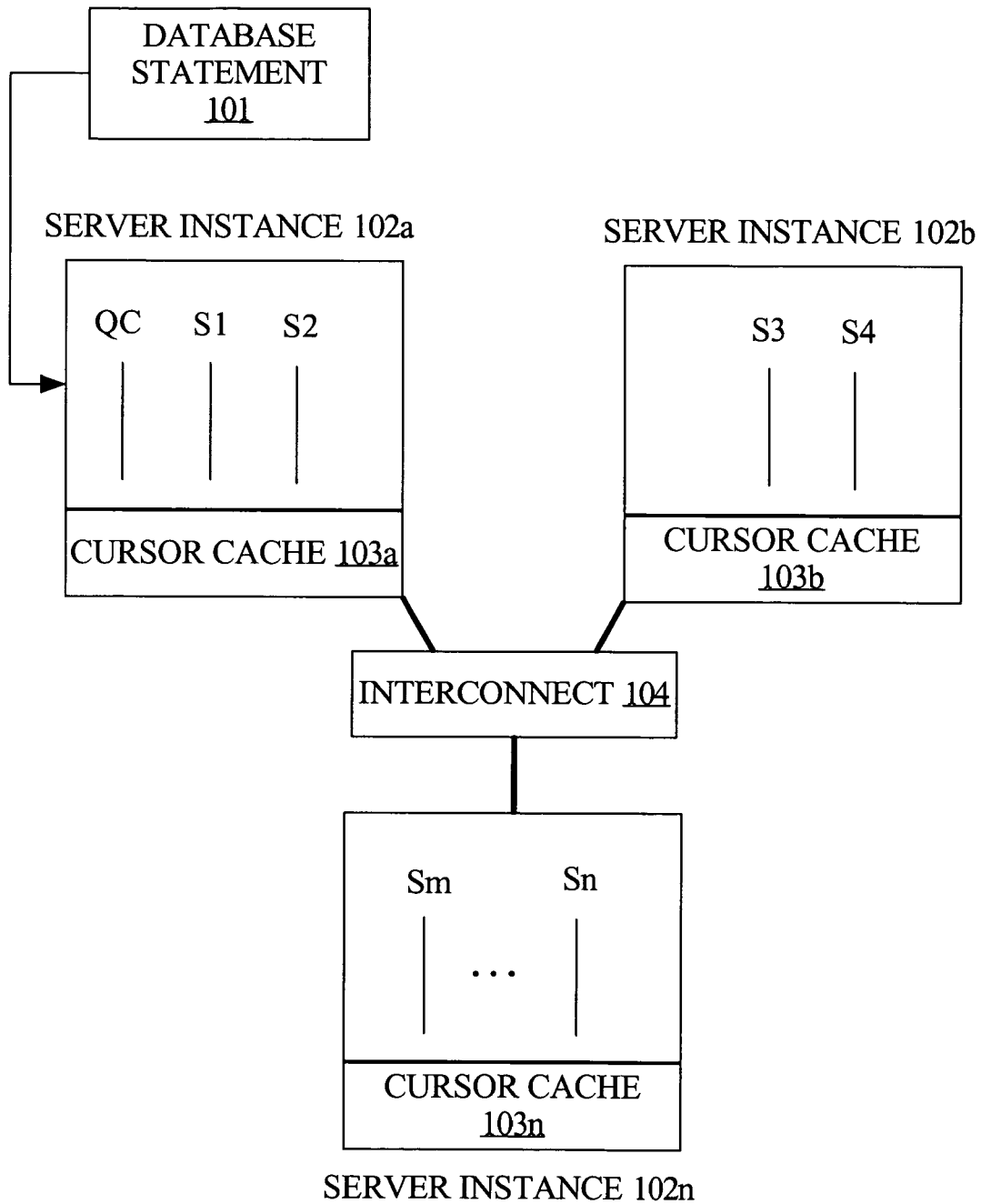
FIG. 1 is a block diagram of an operating environment in which an embodiment of the invention may be implemented.

FIG. 1 is a block diagram of an operating environment in which an embodiment of the invention may be implemented. The operating environment depicted in FIG. 1 is a multi-server, multi-processor environment. Such an operating environment is at times referred to as a "cluster" or a "grid" computing environment. In a database context, with such an environment, execution of database statements, or portions thereof, can be parallelized. Parallelizing execution of a database statement, such as a database query, means that multiple processes can work in parallel to execute respective portions of the statement. The multiple processes, i.e., a query coordinator (QC) process and slave processes, may be running on different hardware nodes on which a respective one or more server instances execute, as depicted in FIG. 1. Alternatively, the QC and the slaves may be running on a single node on which multiple server instances execute.

FIG. 1 depicts multiple server instances 102a, 102b, 102n, that intercommunicate via one or more interconnects 104, such as one or more buses. A server is combination of integrated software components and an allocation of computational resources, such as memory, a node, and processes on the node for executing the integrated software components on a processor, where the combination of the software and computational resources are dedicated to providing a particular type of function on behalf of clients of the server. An example of a server is a database server. Among other functions of database management, a database server governs and facilitates access to a particular database, processing requests by clients to access the database.

Resources from multiple nodes in a cluster can be allocated to running a server's software. Each allocation of the resources of a particular node for the server is referred to herein as a "server instance" or instance. A database server can be clustered, where the server instances, such as server instances 102-102n, may be collectively referred to as a cluster. Each instance of a database server facilitates access to the same database.

Server instance 102a is depicted as having an associated cursor cache 103a, in which cursors are cached. As mentioned, various database languages, such as SQL, support special-purpose constructs referred to herein as "cursors". During the compilation of a query statement, the database server may perform a significant amount of preliminary work for the statement, such as parsing, semantic analysis, and query plan generation. A cursor stores the results of much of this preliminary work. In response to receiving a database statement, such as database statement 101, server instance 102a may examine its cursor cache 103a to determine whether or not a cursor corresponding to the statement has already been created for the same or a similar statement. If a useable cursor is available in cursor cache 103a, then slave processes S1 and S2 can use the information in the cached cursor to assist in parallel processing of the statement. If a useable cursor is not available in cursor cache 103a, a compilation process is performed on the database statement, from which results are stored. Information that may be stored in a cursor is described in greater detail hereafter.

Server instance 102a operates in a multi-process manner. Hence, multiple processes and associated resources can be used to execute in parallel database statement 101. Thus, server instance 102a is depicted as running a QC process and slave processes S1 and S2. Depicting server instance 102a as running two slave processes is arbitrary, and for purposes of example, and does not limit embodiments to use of a particular number of slave processes or a particular degree of parallelism.

Server instance 102a is part of a multi-server cluster that may interoperate to process and execute database statements (e.g., queries), such as database statement 101. Hence, in furtherance of parallel processing of database statement 101, server instance 102a communicates with each of server instances 102b-102n through one or more interconnects 104. Depicting a number of server instances 102a, 102b, 102n operating as a cluster is arbitrary, and for purposes of example, and does not limit embodiments to use of a particular number of server instances.

Server instance 102b is another instance of the same or similar server as server instance 102a. Server instance 102b has an associated cursor cache 103b, in which cursors are cached. In a single parallel cursor (PSC) model, in response to receiving, from the QC, instructions to join in parallel processing of a database statement, server instance 102b may examine its cursor cache 103b to determine whether or not a cursor corresponding to the statement has already been created for the same or a similar statement. If a useable cursor is available in cursor cache 103b, then slave processes S3 and S4 can use the information in the cached cursor to assist in parallel processing of the statement. A useable cursor may have been previously generated by server instance 102b or may have been received from another instance, such as server instance 102a. If a useable cursor is not available in cursor cache 103b, one or more of the slave processes S3, S4 running on server instance 102b perform a compilation process on the database statement. Results of the compilation process may then be stored in cursor cache 103b.

PSC Model

As mentioned, a parallel single cursor (PSC) model involves a system in which a single cursor is shared between several processes. For example, a cursor has been generated by server 102a based on database statement 101 received from a database application. One approach to a PSC is described in U.S. patent application Ser. No. 10/901,411. According to one embodiment described in the reference, the cursor includes the original statement of the database command (typically a SQL statement) for which the cursor was generated, and an execution plan that describes a plan for accomplishing all of the operations specified by the original statement.

For the purpose of explanation, it is assumed that the database statement specifies one or more operations that can be parallelized. Consequently, the cursor containing the complete execution plan is made available to a query coordinator to allow the query coordinator to coordinate the parallel execution of those operations. The query coordinator, such as QC on server instance 102a, coordinates the parallel execution of an operation by providing to slave processes information that causes each of the slave processes to perform a portion of the parallel operation. However, the information provided to the slave processes needs to be separately parsed and compiled by one or more slave processes on each remote server instance 102a-102n participating in parallel processing of the statement.

Execution Plan for Parallel Execution

During the compilation of the original SQL statement, the optimizer within the database server may generate a logical execution plan in multiple passes. For example, in the first pass, the join order and access methods are picked to minimize the parallel cost of a plan (analogous to total system usage cost) given the degree of parallelism (DOP) specified for each object in the query. While computing the parallel cost of a plan in this pass, the database server takes various parallel characteristics into account, such as number of nodes, number of partitions (table or index fragment) of each object, and the default distribution method.

In the second pass, the optimizer computes the best distribution method for each operation in the parallel plan. The result is a logical representation of the execution plan, which is then compiled into a tree-based representation of physical operators (row-sources). In this phase, the database server also clumps row sources into DFO's and performs some physical optimizations taking into account specific knowledge of the requirement of the operator such as clustering, ordering or data fragmentation. The process of clumping row sources is typically performed while building the row source tree for the execution plan of the statement. Clumping generally involves grouping neighboring row sources to encapsulate or define a connected component of the plan tree which will be executed on a single slave process as a single piece. Clumping is used by the database server to define DFOs. When two neighboring row sources in the plan tree are not clumped together, they belong to different DFOs (i.e., there is a DFO boundary between them).

Communication with the Remote Nodes

The complete plan is communicated by sharing the same physical copy of the plan when the slaves and QC run on the same node, such as the node hosting server instance 102a, and by linearizing and shipping the original SQL statement to remote nodes participating in the execution, such as the nodes hosting server instances 102b-102n. On each remote node, the original statement is delinearized, reconstructed, and built into the cursor by one slave, and shared by all others on the same node. Hence, the QC and all slaves share or use the same parallel single cursor. At execution time, the QC only has to send control information to slaves to schedule the various DFOs.

As mentioned above, slaves on the same database server as the QC will usually share the cursor generated by the QC (the "master cursor"), and thereby share access to the same parallel plan (the "master plan"). However, slaves on other database servers ("remote servers") are typically not able to directly access the volatile memory containing the master cursor. Thus, according to one embodiment, slaves on remote servers ("remote slaves") perform a hard parse of the original statement, and only participate in execution of the parallel query if the remote slaves generate a plan that is equivalent to the master plan.

Increase Likelihood of Slaves Joining the Query Execution

According to one embodiment, techniques are provided to ensure that the remote slaves on a remote server participate in execution of the parallel query if and only if the parallel plan built at the remote server (the "remote plan") is equivalent to the master plan. To increase the likelihood that remote slaves generate an equivalent plan, sufficient information is sent over to the remote slaves to make the SQL compilation process behave as on the QC. For example, U.S. patent application Ser. No. 10/901,411 describes communicating certain statistics and various types of parameters to slave processes, to increase the likelihood that the remote plans built by the remote slaves will be equivalent to the master plan. The foregoing reference describes such use of Extent Map statistics and Dynamic Statistics and session, system and initialization parameters.

Unfortunately, it is possible for a remote node to compile the original statement in a manner that produces a remote plan that is sufficiently different from the master plan. U.S. patent application Ser. No. 10/901,411 describes the equivalence of a remote plan to the master plan. Under circumstances in which the remote plan is sufficiently different from the master plan, i.e., the remote plan is not equivalent to the master plan, use of the remote plan would lead to errors. Therefore, according to one embodiment, the correctness of such remote plans is determined by (1) generating one or more signatures based on the contents of the master plan, (2) generating one or more signatures based on the contents of each remote plan, and (3) comparing the signatures of the master plan against the signatures of each of the remote plans.

U.S. patent application Ser. No. 10/901,411 also describes the generation and use of plan signatures for determining whether or not a remote plan is equivalent to a corresponding master plan. If the signatures of a remote plan do not match the signatures of the master plan, then the remote plan is considered incorrect. Consequently, the slaves that would otherwise have used the incorrect remote plan do not participate in the execution of the query. Thus, it is possible to have a situation in which no slaves join the parallel query. Under such circumstances, the query is executed serially. However, serial execution is undesirable. Therefore, according to embodiments of the invention, hints are provided to the remote slaves processes in order to increase the likelihood that remote slaves generate an equivalent plan, which is described in greater detail hereafter.

Hints—Generally

Hints are a general mechanism to supply directives to a database statement compilation process to influence the plan generated by the compilation process. For example, hints can direct use of a particular access path for a table, a particular join method for a join, or a particular join order for tables. Consequently, hints can be used to affect the generation of an execution plan by a remote slave process, such as to increase the likelihood that a slave process on a remote node generates a remote plan that is equivalent to the corresponding master plan. A database server, such as server instances 102a-102n, can automatically create outlines for all SQL statements, or outlines can be created for specific SQL statements. In either case, the outlines derive their input from the optimizer.

Listed in Table 1 below are some hints that are widely used and are presented as examples. This list is not exhaustive and, therefore, embodiments of the invention are in no way limited to use of the listed hints.

TABLE 1

| | |
|---|---|
| FULL: | for doing a full table scan on the table. |
| HASH: | hash scan, applies to clustered tables and is not to be confused with HASH join. |
| ROWID: | table scan by rowid. |
| CLUSTER: | cluster scan, applies to clustered tables. |
| INDEX: | index scan, specify the table and the index name. |
| INDEX_ASC: | for range scan, scan index in ascending order of values. |
| INDEX_DESC: | for range scan, scan index in descending order of values. |
| INDEX_JOIN: | use index join as an access path. Two indexes could be joined to return the required values. |
| INDEX_FFS: | perform a fast full scan on the index rather than on the table. |
| NO_INDEX: | avoid the use of the specified index or all indexes. |
| AND_EQUAL: | merge 2-5 single column index scans to arrive at the output. |
| INDEX_COMBINE: | explicitly choose a bitmap access path, make use of bitmap indexes. |
| ORDERED: | access and join tables in the order mentioned in the FROM clause, left to right. |
| USE_NL: | use Nested Loop for joining tables. |
| USE_HASH: | use Hash joins. |
| USE_MERGE: | use Sort-Merge joins. |

Global Hints

As described in U.S. patent application Ser. No. 10/936,781, global hints provide a mechanism to deliver external tuning information to an optimizer that is compiling a SQL statement. Global hints can be created and used manually by a database administrator (DBA) to tune specific SQL statements, or can be automatically created by SQL tuning tools. The global hints can be associated with a specific part of the SQL statement, such as a table or a query block, without being physically located in the query block of the statement itself. For example, the global hints may be stored outside of the targeted object (e.g., the table, query block or SQL statement).

Because the hints are created and stored separately from the SQL statement, they can be dynamically associated with a SQL statement from an external storage location, such as a SQL tuning base (STB), and retrieved by the optimizer from the external storage location when compiling the SQL statement. The SQL tuning base stores SQL profiles, which are a source of external hints. As compared to the conventional notion of embedded hints, which are embedded in the query text, external hints are stored in dictionary tables in the STB and are associated with specific SQL statements.

A global hint associated with a SQL statement may target a query block that is not in the original SQL statement, but rather is created as a result of a query transformation when the SQL statement is compiled. Each query block in a SQL statement has an assigned unique name, so that the global hints can target any query block by specifying the name of the targeted block. Similarly, each table within a query block has a unique alias, which is used by the global hints to target the table. Therefore, the global hints are able to specify which query block, and which tables within the query block, are targeted to receive the tuning information, even if the query blocks are created when the statement is being compiled.

Communicating to Remote Nodes

Figure 2:
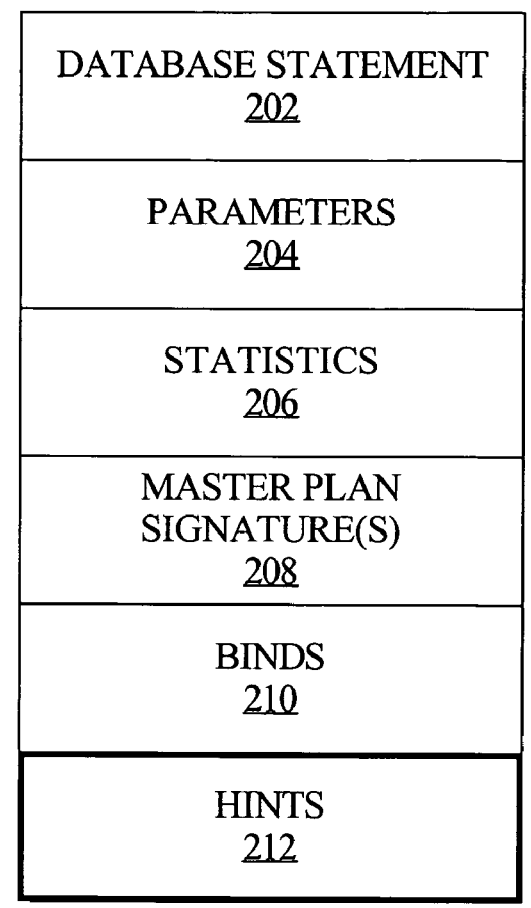
FIG. 2 is a block diagram that illustrates information that is communicated to remote nodes in a multi-server system for use in generation of an execution plan for a database statement, according to an embodiment of the invention.

As mentioned, to increase the likelihood that remote slaves generate an equivalent plan, sufficient information is sent over to the remote slaves to make the SQL compilation process behave as on the QC. FIG. 2 is a block diagram that illustrates information that is communicated to remote nodes in a multi-server system for use in generation of an execution plan for a database statement, according to an embodiment of the invention. In the context of the operating environment of FIG. 1, the information depicted in FIG. 2 is sent from the server on which the QC is running, e.g., server instance 102a, to each of the other interconnected servers which are desired to join in parallel execution of the statement, e.g., server instances 102b-102n. Such information may be sent to the remote nodes via a series of one or more messages, through the interconnect(s) 104. According to one embodiment, such information is sent to each slave on each remote node, e.g., each of slaves S3, S4, Sm, Sn.

The information sent to the remote node(s) is in response to receiving a database statement at a server, such as server instance 102a (FIG. 1). According to one embodiment, the information sent to the remote nodes includes, but is not limited to, each of (a) the original database statement 202 (e.g., the original top level SQL text, such as database statement 101), (b) parameters 204, (c) statistics 206, (d) one or more master plan signatures 208, (e) binds 210, and significantly, (f) hints 212. However, in some embodiments, the parameters 204 and/or the statistics 106 may not be sent to the remote nodes.

According to one embodiment, and as described in U.S. patent application Ser. No. 10/901,411, all the parameters 204 used through the compilation phase are captured on the QC and propagated to the remote slaves that are asked to participate in the parallel execution of the query. Some examples of such parameters are: optimization parameters (e.g. complex_view_merging, query_unnesting, grouping_set_rewrite etc.), memory parameters (e.g. those used by the dynamic memory manager to decide on sort sizes), and machine parameters (e.g., cpu_count, instance_count etc).

According to one embodiment, statistics 206 are propagated to the remote slaves that are asked to participate in the parallel execution of the query. For example, the statistics 206 are statistics about unanalyzed database objects, e.g., tables. According to one embodiment, and as described in U.S. patent application Ser. No. 10/901,411, two kinds of statistics which are used by the optimizer in costing plans, are propagated from the QC to the slaves: Extent Map statistics and Dynamic Statistics.

According to one embodiment, one or more plan signatures 208 based on the contents of the master plan are propagated to the remote slaves that are asked to participate in the parallel execution of the query. As mentioned, the master plan signatures 208 can be compared to one or more corresponding signatures based on the contents of each remote plan, to determine whether the respective remote plans are equivalent to the master plan.

According to one embodiment, one or more binds 210 are propagated to the remote slaves that are asked to participate in the parallel execution of the query. Binds 210 are values of any bind variables associated with the original database statement.

Hence, as described in U.S. patent application Ser. No. 10/901,411, database statement 202, parameters 204, statistics 206, plan signature(s) 208 and binds 210 can be used by the remote slaves for generating an execution plan (i.e., a "remote plan") for the database statement 202. Use of the foregoing information in generation of a remote execution plan is relatively likely to result in a remote plan that is equivalent to the master plan. Whether or not a respective remote plan is equivalent to the master plan is determinable by comparing master plan signature(s) 208 with remote plan signature(s) generated based on each respective remote plan, as described in U.S. patent application Ser. No. 10/901,411.

However, despite sending the foregoing information to the slaves to use in the compilation process, there is inherent non-determinism in the compilation (e.g. use of dynamic sampling and statistics, complex code-path which may not be same on the QC and slave because of historical design/development issues, etc.) which could cause the plan to be different on the QC instance versus remote instances. These differences have been noticed primarily in the area of access paths, which in turn cause differences in join order. Hence, if a remote plan generated based on the database statement 202, parameters 204, statistics 206, plan signature(s) 208 and binds 210 is not equivalent to the master plan, then a process is performed as illustrated in, and described in reference to, FIG. 3.

Stored Outlines

Execution plans can be preserved in "stored outlines." An outline typically includes a set of hints that outlines (and, therefore, is effectively equivalent to) the database optimizer's execution plan generated for a particular SQL statement. The database server uses the input to the execution plan to generate an outline, and not the execution. plan itself. Thus, outlines are in effect used to record execution plans. Hence, when SQL text corresponding to a stored outline is encountered, e.g., by a slave process, then the corresponding hints are applied to generation of a corresponding execution plan for the SQL text.

Using Hints in Generating a Remote Plan

As described above, hints, such as hints 212, are a mechanism to supply directives to a database statement compilation process to influence the plan generated by the compilation process. Hence, in addition to providing the database statement 202, parameters 204, statistics 206, plan signature(s) 208 and binds 210 to the remote slaves, according to one embodiment, hints 212 are also provided to the remote slaves. According to one embodiment, hints 212 are in the form of a stored outline created according to conventional technology based on the same information used to generate the execution plan by the QC.

Figure 3:
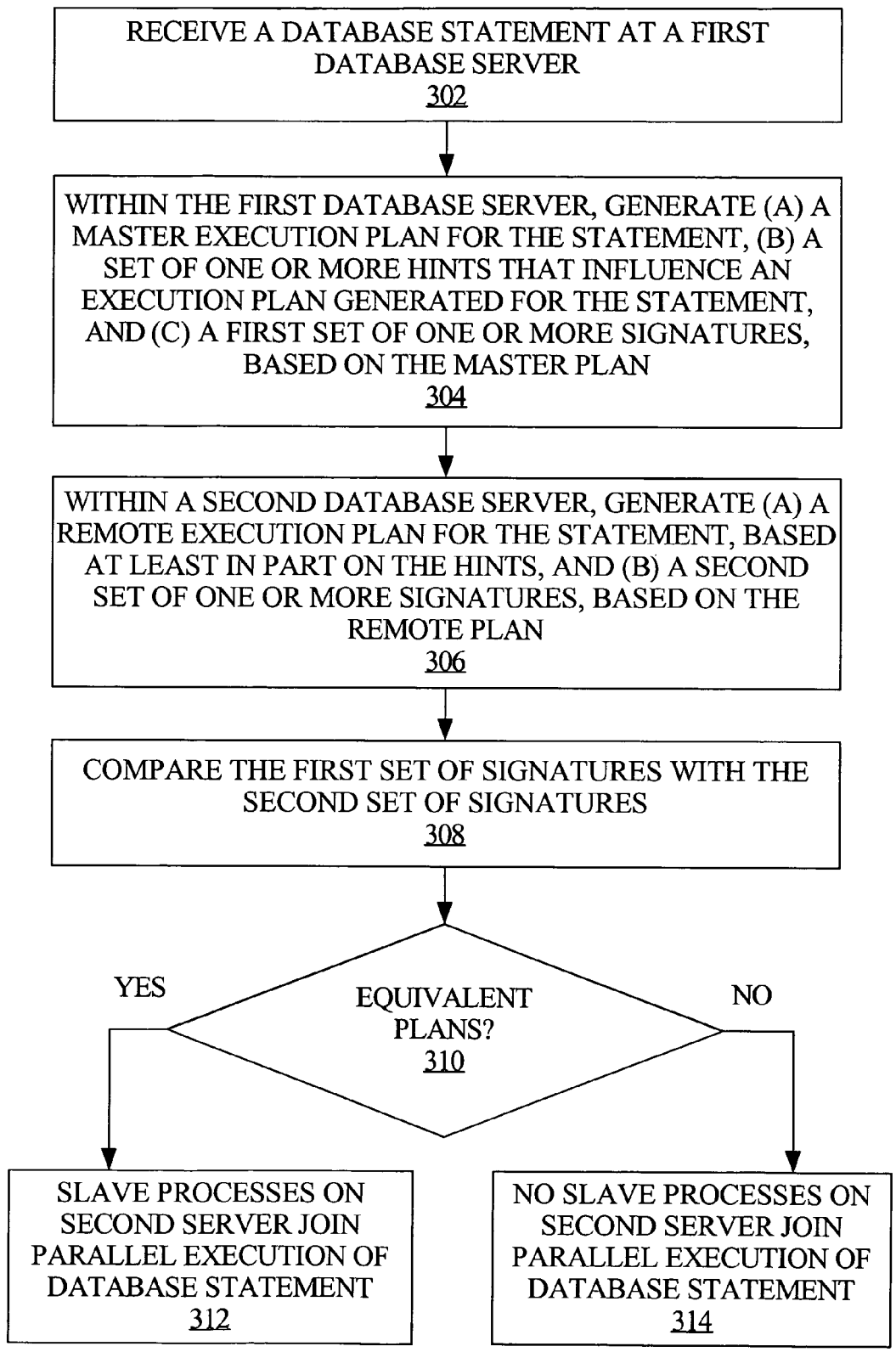
FIG. 3 is a flow diagram that illustrates a method for processing a database statement in a multi-server system, according to an embodiment of the invention.

FIG. 3 is a flow diagram that illustrates a method for processing a database statement in a multi-server system, according to an embodiment of the invention. The process illustrated in FIG. 3 is implemented for automated performance by a conventional computing system, such as computer system 400 of FIG. 4. Further, according to one embodiment, the process illustrated in FIG. 3 is implemented in an operating environment as that illustrated in FIG. 1.

According to one embodiment, the method of FIG. 3 is performed in response to a given remote plan being generated, based in part on the parameters 204 and statistics 206, which is not equivalent to the master plan.

Alternatively, the method of FIG. 3 is performed without first using the parameters 204 and statistics 206 for generating an execution plan for the database statement 202. That is, the method of FIG. 3 is performed as a standalone process rather than as a fallback process to the process described in U.S. patent application Ser. No. 10/901,411.

At block 302, a database statement is received at a first database server. For example, database statement 101 (FIG. 1), in the form of a SQL query, is received at server instance 102a (FIG. 1). At block 304, within the first database server, the following are generated:
  (a) a "master" plan about how to execute the database statement;
  (b) a set of one or more hints that represent directives that influence an execution plan generated for the database statement, such as hints 212 embodied in a stored outline; and
  (c) a first set of one or more signatures that are based on the master plan.

At block 306, within a second database server, the following are generated:
  (a) a "remote" plan about how to execute the database statement, based at least in part on the set of one or more hints, such as hints 212; and
  (b) a second set of one or more signatures that are based on the remote plan.

According to one embodiment, the remote plan is generated based on the original database statement 202, the binds 210 and the set of one or more hints 212. That is, the parameters 204 and statistics 206 are not used for generating the remote plan. According to an alternative embodiment, the remote plan is generated based on the original database statement 202, the parameters 204, the statistics 206, the binds 210 and the set of one or more hints 212. Regardless of whether the plan is based on the parameters 204 and statistics 206, use of the hints is more likely to generate a remote plan that is equivalent to the master plan.

At block 308, the first set of one or more signatures, which are based on the master plan, is compared to the second set of one or more signatures, which are based on the remote plan. Hence, at decision block 310, it is determined whether or not the remote plan and the master plan are equivalent, based on the comparison of block 308.

If the remote and master plans are equivalent, then at block 312, one or more slave processes on the second database server use the remote plan to participate in parallel execution of at least one operation required by the database statement. On the other hand, if the remote and master plans are not equivalent, then at block 314, none of the slave processes on the second database server participate in parallel execution of any operations required by the database statement.

Hardware Overview

Figure 4:
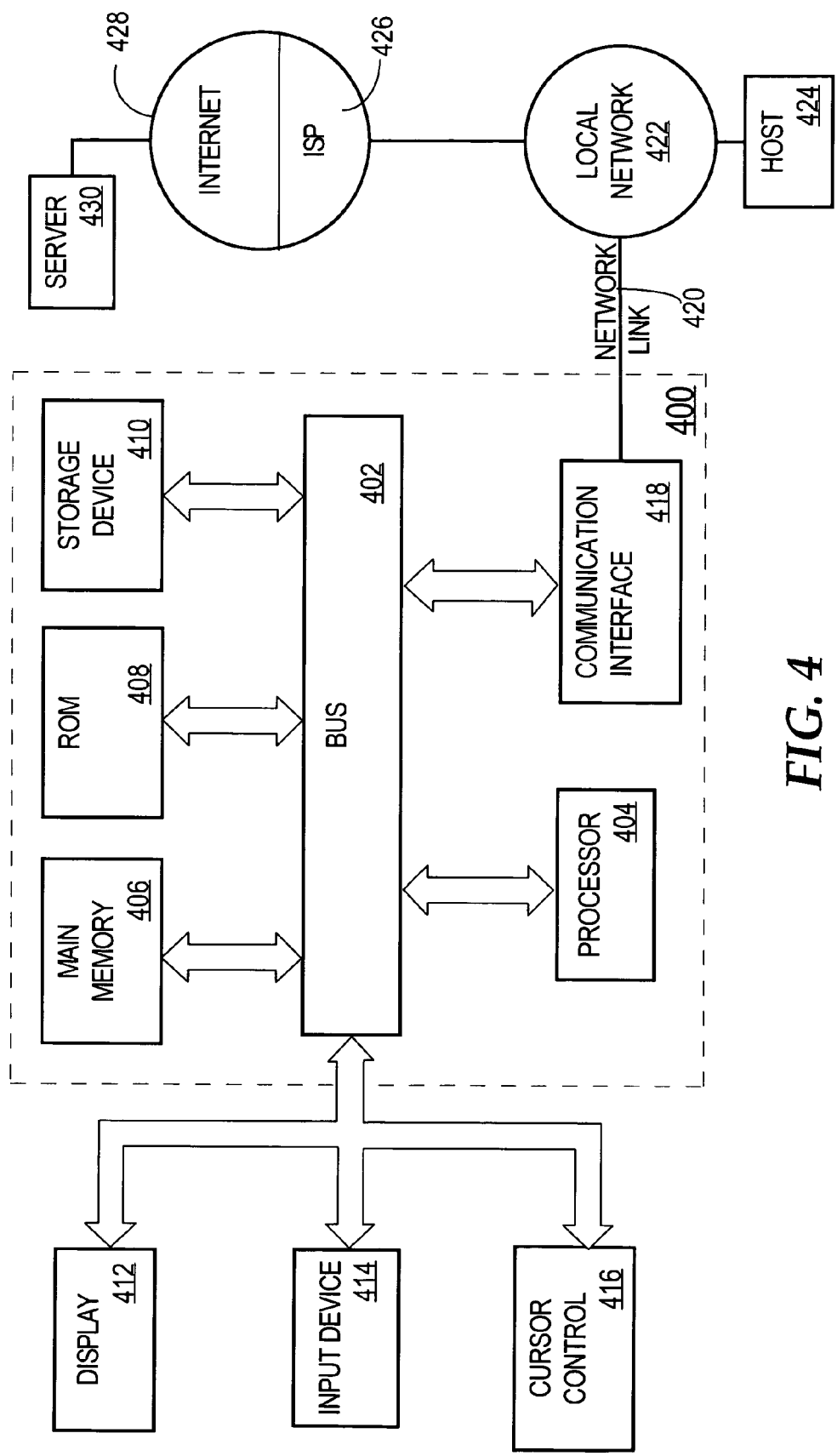
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for processing a database statement in a multi-server system, the method comprising:
   receiving the database statement at a first database server;
   within the first database server, generating
      a master plan about how to execute the database statement, and a set of one or more hints that represent directives that specify statements that are to govern construction of an execution plan generated for the database statement;

within a second database server, generating a remote plan about how to execute the database statement, based at least in part on the statements specified by directives represented in the set of one or more hints; and if the remote plan is equivalent to the master plan, then one or more slaves on the second database server using said remote plan to participate in parallel execution of at least one operation required by the database statement;

wherein the remote plan is equivalent to the master plan if and only if use of the remote plan by the one or more slaves, while the one or more slaves participate in parallel execution of the at least one operation, will produce correct results for said at least one operation.

2. The method of claim 1, comprising:

within the first database server, generating a first set of one or more signatures, based on the master plan;

within the second database server, generating a second set of one or more signatures, based on the remote plan; and comparing the first set of one or more signatures to the second set of one or more signatures to determine whether the remote plan is equivalent to the master plan.

3. The method of claim 2, wherein, if the remote plan is not equivalent to the master plan, then no slaves on the second database server participate in parallel execution of the at least one operation.

4. The method of claim 2, wherein the remote plan based on the set of one or more hints is a second remote plan and the second set of one or more signatures based on the remote plan is a second set of signatures generated by the second database server; and wherein generating a remote plan comprises generating the remote plan about how to execute the database statement based at least in part on the set of one or more hints in response to within the second database server, generating a first remote plan about how to execute the database statement, not based on the set of one or more hints;

a first set of one or more signatures generated by the second database server based on the first remote plan; and comparing the first set of one or more signatures to the first set of one or more signatures generated by the second database server and determining that the first remote plan is not equivalent to the master plan.

5. The method of claim 1 wherein both the master plan and the remote plan are complete plans for executing the database statement.

6. The method of claim 1, wherein the set of one or more hints includes a directive to use a particular access path during execution of the at least one operation.

7. The method of claim 1, wherein the set of one or more hints includes a directive to join two or more tables in a particular order during execution of the at least one operation.

8. The method of claim 1, wherein the set of one or more hints includes a directive to join two or more tables using a particular type of join operation during execution of the at least one operation.

9. The method of claim 1, wherein the set of one or more hints includes a directive to use a particular degree of parallelism during execution of the at least one operation.

10. The method of claim 1 wherein the set of one or more hints is based on information on which generation of the master plan by the first database server is based.

11. The method of claim 1 further comprising the step of:

the first database server sending to the second database server the set of one or more hints;

wherein the set of one or more hints is based on information on which generation of the master plan, during compilation of the database statement by the first database server, is based.

12. A machine-readable storage medium storing one or more sequences of instructions which, when executed by one or more processors, causes the one or more processors to perform the method recited in claim 1.

13. A machine-readable storage medium storing one or more sequences of instructions which, when executed by one or more processors, causes the one or more processors to perform the method recited in claim 2.

14. A machine-readable storage medium storing one or more sequences of instructions which, when executed by one or more processors, causes the one or more processors to perform the method recited in claim 3.

15. A machine-readable storage medium storing one or more sequences of instructions which, when executed by one or more processors, causes the one or more processors to perform the method recited in claim 4.

16. A machine-readable storage medium storing one or more sequences of instructions which, when executed by one or more processors, causes the one or more processors to perform the method recited in claim 5.

17. A machine-readable storage medium storing one or more sequences of instructions which, when executed by one or more processors, causes the one or more processors to perform the method recited in claim 6.

18. A machine-readable storage medium storing one or more sequences of instructions which, when executed by one or more processors, causes the one or more processors to perform the method recited in claim 7.

19. A machine-readable storage medium storing one or more sequences of instructions which, when executed by one or more processors, causes the one or more processors to perform the method recited in claim 8.

20. A machine-readable storage medium storing one or more sequences of instructions which, when executed by one or more processors, causes the one or more processors to perform the method recited in claim 9.

21. A machine-readable storage medium storing one or more sequences of instructions which, when executed by one or more processors, causes the one or more processors to perform the method recited in claim 10.

22. A machine-readable storage medium storing one or more sequences of instructions which, when executed by one or more processors, causes the one or more processors to perform the method recited in claim 11.

* * * * *

UNITED STATES PATENT AND TRADEMARK OFFICE
CERTIFICATE OF CORRECTION

PATENT NO. : 7,475,056 B2
APPLICATION NO. : 11/202453
DATED : January 6, 2009
INVENTOR(S) : Ghosh et al.

It is certified that error appears in the above-identified patent and that said Letters Patent is hereby corrected as shown below:

In column 11, line 33, after "execution" delete ".".

Signed and Sealed this

Thirty-first Day of August, 2010

David J. Kappos
*Director of the United States Patent and Trademark Office*